USO10283925B2

(12) United States Patent
Lewandowski et al.

(10) Patent No.: US 10,283,925 B2
(45) Date of Patent: May 7, 2019

(54) METHOD FOR FORMING AN ELECTRICAL CONNECTION (71) Applicant: TOTAL SA, Courbevoie (FR)

(72) Inventors: Alexandre Lewandowski, Pau (FR); Franck Rey-Bethbeder, Pau (FR); Dominique Delaporte, Pau (FR); Alain Lechon, Pau (FR); Maurice Geli, Lescar (FR); Yann Buzaré, Gelos (FR)

(73) Assignee: Total SA, Courbevoie (FR)

( * ) Notice: Subject to any disclaimer, the term of this patent is extended or adjusted under 35 U.S.C. 154(b) by 169 days.

(21) Appl. No.: 15/104,183

(22) PCT Filed: Dec. 2, 2014

(86) PCT No.: PCT/FR2014/053135
§ 371 (c)(1),
(2) Date: Jun. 13, 2016

(87) PCT Pub. No.: WO2015/086955
PCT Pub. Date: Jun. 18, 2015

(65) Prior Publication Data
US 2016/0377215 A1    Dec. 29, 2016

(30) Foreign Application Priority Data
Dec. 12, 2013    (FR) ..................... 13 62507

(51) Int. Cl.
*F16L 53/35* (2018.01)
*H01R 43/24* (2006.01)
(Continued)

(52) U.S. Cl.
CPC .............. *H01R 43/24* (2013.01); *F16L 53/35* (2018.01); *H01R 4/04* (2013.01); *H01R 4/726* (2013.01);
(Continued)

(58) Field of Classification Search
CPC ....... B32B 27/304; B32B 27/34; H05B 3/145; F16L 53/005
See application file for complete search history.

(56) References Cited

U.S. PATENT DOCUMENTS 3,800,121 A    3/1974 Dean et al.
3,943,273 A    3/1976 De Putter
(Continued)

FOREIGN PATENT DOCUMENTS

CN        2800021 Y       7/2006
DE     203 11 617 U1    12/2004
(Continued)

OTHER PUBLICATIONS

Search Report for related French Application No. FR 1362506 dated Jul. 22, 2014; 2 pages.
(Continued)

*Primary Examiner* — Minh Trinh
(74) *Attorney, Agent, or Firm* — Patterson Thuente Pedersen, P.A.

(57) ABSTRACT

A method for forming an electrical connection in a pipe for transporting a fluid. The pipe comprises an internal hollow tube and a heating layer comprising first fibers made of carbon. There are performed a groove-formation step in which a groove is formed in the heating layer, an interface-preparation step in which a junction layer is placed on the heating layer of the groove, and a placement step in which a connection strip comprising second fibers formed of a second electrically conducting material is wound on the junction layer.

11 Claims, 5 Drawing Sheets (51) Int. Cl.
*H05B 3/14* (2006.01)
*H05B 3/58* (2006.01)
*H01R 4/72* (2006.01)
*H05B 3/06* (2006.01)
*H01R 4/04* (2006.01)
*H05B 3/03* (2006.01)
*H01R 4/14* (2006.01)

(52) U.S. Cl.
CPC ............... *H05B 3/03* (2013.01); *H05B 3/06* (2013.01); *H05B 3/145* (2013.01); *H05B 3/58* (2013.01); *H01R 4/14* (2013.01); *H05B 2203/017* (2013.01); *H05B 2214/02* (2013.01); *H05B 2214/03* (2013.01); *H05B 2214/04* (2013.01)

(56) References Cited

U.S. PATENT DOCUMENTS

| | | | | |
|---|---|---|---|---|
| 4,250,398 | A * | 2/1981 | Ellis | B32B 7/02 219/549 |
| 4,628,187 | A * | 12/1986 | Sekiguchi | B60R 1/0602 219/505 |
| 6,142,707 | A * | 11/2000 | Bass | E21B 17/015 405/158 |
| 7,033,113 | B2 * | 4/2006 | March | F16L 9/18 405/158 |
| 2006/0196568 | A1 * | 9/2006 | Leeser | F16L 9/18 138/149 |
| 2009/0107558 | A1 | 4/2009 | Quigley et al. | |
| 2010/0290764 | A1 | 11/2010 | Borgmeier et al. | |
| 2013/0025728 | A1 | 1/2013 | Bigex et al. | |
| 2013/0028580 | A1 | 1/2013 | Bigex et al. | |
| 2013/0048128 | A1 | 2/2013 | Roederer et al. | |
| 2013/0064528 | A1 | 3/2013 | Bigex et al. | |
| 2013/0087278 | A1 | 4/2013 | Chang et al. | |
| 2013/0108250 | A1 | 5/2013 | Bigex et al. | |
| 2013/0336643 | A1 | 12/2013 | Borgmeier et al. | |
| 2016/0377215 | A1 * | 12/2016 | Lewandowski | F16L 53/005 29/878 |

FOREIGN PATENT DOCUMENTS

| | | |
|---|---|---|
| DE | 20 2008 003 365 U1 | 8/2009 |
| DE | 10 2010 010 929 A1 | 9/2011 |
| FR | 2 132 759 | 11/1972 |
| FR | 2 220 120 | 9/1974 |
| FR | 2 958 991 A1 | 10/2011 |
| FR | 2 958 992 A1 | 10/2011 |
| FR | 2 958 994 A1 | 10/2011 |
| FR | 2 958 995 A1 | 10/2011 |
| GB | 2 403 995 A | 1/2005 |
| WO | WO 02/104074 A1 | 12/2002 |
| WO | WO 2006/077157 A1 | 7/2006 |
| WO | WO 2011/128544 A1 | 10/2011 |
| WO | WO 2011/128545 A1 | 10/2011 |
| WO | WO 2011/128546 A1 | 10/2011 |
| WO | WO 2011/128547 A1 | 10/2011 |

OTHER PUBLICATIONS

Search Report for related French Application No. FR 1362507 dated Aug. 19, 2014; 2 pages.
Search Report for related French Application No. FR 1362509 dated Jul. 25, 2014; 2 pages.
International Search Report for related International Application No. PCT/FR2014/053135 dated Mar. 9, 2015; 7 pages.
International Search Report for related International Application No. PCT/FR2014/053186 dated Apr. 7, 2015; 7 pages.
International Search Report for related International Application No. PCT/FR2014/053126 dated Mar. 10, 2015; 8 pages.

* cited by examiner

METHOD FOR FORMING AN ELECTRICAL CONNECTION

RELATED APPLICATIONS

The present application is a National Phase entry of PCT Application No. PCT/FR2014/053135, filed Dec. 2, 2014, which claims priority from FR Patent Application No. 13 62507, filed Dec. 12, 2013, said applications being hereby incorporated by reference herein in their entirety.

FIELD OF THE INVENTION

The present invention relates to a method for forming an electrical connection on a device, and more specifically to a pipe for transporting a fluid that requires at least occasional heating, the said fluid for example containing a hydrocarbon.

BACKGROUND OF THE INVENTION

The invention relates to a method employed on a device comprising a heating layer, the said heating layer comprising first fibres made of carbon, a first electrically conducting material.

The device is, for example, a heating pipe for transporting a fluid containing for example a hydrocarbon.

Therefore an object of the invention is to form an electrical connection on such a pipe (pipeline) for supplying electrical power to an electrically conducting composite layer. This type of pipe is used in extremely cold environments, on land and at sea, and sometimes at sea at very great depths. Under these conditions, the fluid may freeze, coagulate, set, thicken or form deposits of paraffin or hydrate. These transformations of the fluid may cause blockages and impede the transport of the fluid along the pipe. This is why these pipes may be heated in order to avoid these disadvantages.

One technique is to heat these pipes electrically using conducting lines made of copper placed around the pipes. The heating is first of all concentrated around these lines, and then spreads by conduction. This technique is thus somewhat ineffective.

Another technique is the electrical heating of these pipes using a layer of carbon fibre. Document CN2800021-Y describes a pipe for transporting a hydrocarbon, having a glass fibre reinforced plastic tube and a first layer of carbon fibre which is electrically powered in order to heat the tube. These pipes produce a heating effect that is better distributed.

Document FR-2958991 describes an improved pipe for transporting a hydrocarbon, which further comprises a reinforcing layer suited to improving mechanical integrity. That document further describes means of assembly between pipes and means of supplying electrical power. However, these power-supply means are somewhat ineffective and are complicated to implement.

Document FR-2958994 describes a heating blanket that can be used to heat an element for transporting a hydrocarbon, such as a pipeline, a pipe, a valve or a wellhead.

Document FR-2958995 describes another system for heating these elements, which comprises a heating flexible blanket or membrane such as this.

The device is thus, for example, a substantially planar, or curved, rigid or flexible heating device.

SUMMARY OF THE INVENTION

It is an object of the present invention to improve the means of supplying electrical power to these devices comprising a heating layer having fibres made of carbon which is electrically conductive.

To this end, the method for forming the electrical connection comprises the following steps of forming an electrical connection:
- an interface-preparation step in which a junction layer formed of an electrically conducting junction material is placed on at least one zone of the heating layer, and
- a placement step in which a connection strip comprising second fibres formed of a second electrically conducting material is placed on the junction layer, the said connection strip having at least one portion protruding beyond the said device and forming a terminal for supplying electrical power to the device.

By virtue of these measures, an electrical connection is formed directly. This electrical connection has low electrical resistance, and does not during operation give rise to localized heating. This then prevents the risk of the heated device becoming damaged. The device is thus more reliable.

In various embodiments of the method according to the invention, recourse may also potentially be had to one and/or another of the following measures.

According to one aspect of the invention, the device is a pipe for transporting a fluid, and the pipe comprises:
- an internal hollow tube extending in a longitudinal direction and intended to transport a fluid along the tube, and
- the said heating layer situated within the thickness of the pipe, and before the said steps of forming an electrical connection, the following steps are performed:
- a groove-formation step in which a groove is formed in the heating layer, the said groove being intended to accommodate the electrical connection, and
- at the interface-preparation step, the junction layer is placed over a zone of the heading layer that is uncovered in the groove produced during the groove-formation step, and
- in the placement step, the connection strip is wound around the pipe, in the groove and on the junction layer, and the said portion protrudes from the groove.

According to one aspect of the invention, the groove comprises a first surface in the longitudinal direction and a second surface in a direction opposite to the longitudinal direction, and the junction layer is placed on one of the first and second surfaces.

According to one aspect of the invention, the groove is in the shape of a triangle or of a trapezium, the said groove extending throughout the thickness of the heating layer.

According to one aspect of the invention, the groove is formed by machining of the heating layer.

According to one aspect of the invention, a protection step is also performed in which a protective layer is formed by placing on the connection strip, a composite strip comprising third fibres embedded in a matrix, the said third fibres being formed of a third material that is not electrically conductive.

According to one aspect of the invention, after the said steps of forming an electrical connection, a heating step is performed in which the electrical connection is heated in order to crosslink at least the junction layer.

According to one aspect of the invention, the junction material is a polymer filled with electrically conducting particles.

According to one aspect of the invention, the particles are made of silver, copper, graphene, carbon black, carbon nanotubes.

According to one aspect of the invention, the second fibres are braided.

According to one aspect of the invention, the second material is copper.

BRIEF DESCRIPTION OF THE DRAWINGS

Further features and advantages of the invention will become apparent during the course of the following description of at least one of the embodiments thereof which is given by way of nonlimiting example with reference to the attached drawings.

In the drawings:

FIG. 1b is a transverse side view of the pipe of FIG. 1a;

In the various figures, the same numerical references denote elements that are identical or similar.

DETAILED DESCRIPTION OF EMBODIMENTS

In the present description, the terms "front" and "rear" are used in relation to the longitudinal direction X. The terms "upper" or "upwards" and "lower" or "downwards" are used in relation to the vertical direction Z, upwards, perpendicular to the longitudinal direction X and to the transverse direction Y.

The term "pipe" in the present invention is to be understood as referring to a device comprising a tube for transporting a fluid at least between an inlet and an outlet, it being possible for the device to comprise other elements such as a valve, or multiple branches.

Figure 1A:
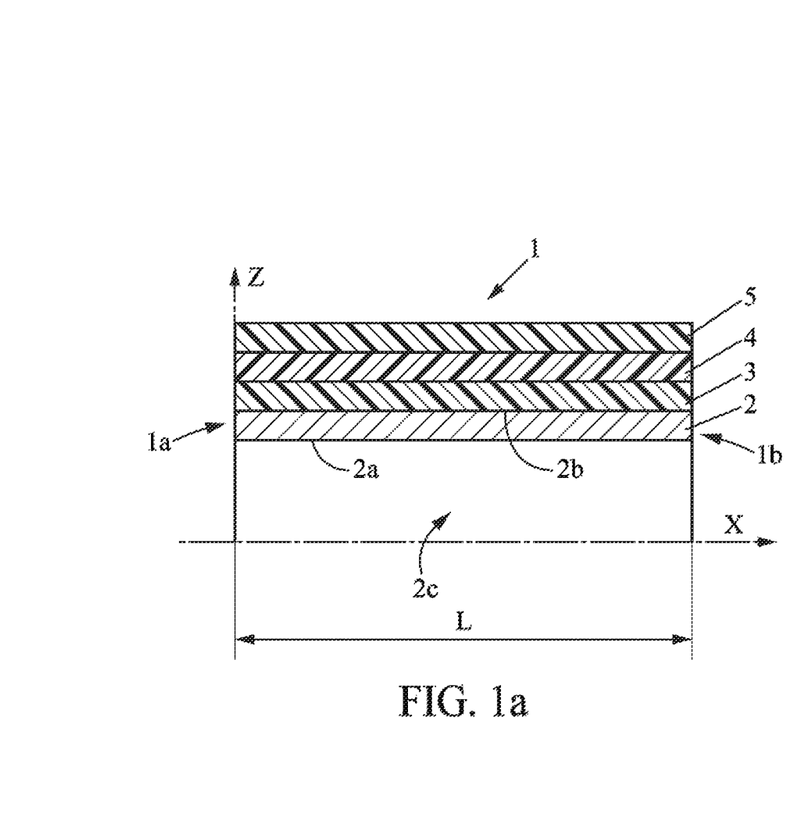
FIG. 1a is a view in longitudinal section of a composite heating pipe.
Figure 1B:
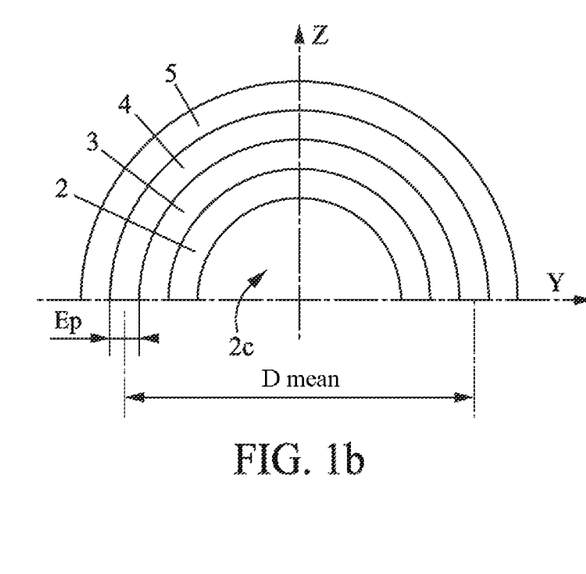

FIGS. 1a and 1b show a pipe 1 for applying the method according to the invention, the said pipe 1 being in longitudinal section on a plane XZ and in transverse section on a plane YZ. In these figures, just an upper half above the axis X is shown, the lower other half being substantially identical by symmetry about the axis X.

The pipe 1 comprises a hollow tube 2 extending in the longitudinal direction of axis X between a first and second end 1a, 1b of the pipe. This tube 2 comprises an internal surface 2a near the axis X, and an external surface 2b further away from the axis X. On the inside of the internal surface 2a extends a cavity 2c between an inlet and an outlet of the cavity which inlet and outlet are situated one at each of the ends. The cavity 2c is suited to transporting the fluid between the said inlet and the said outlet.

The pipe 1 has a cross section of substantially cylindrical shape in the YZ plane, although other shapes could be produced.

The tube 2 may be made from an electrically conducting material such as steel, as has been depicted in the figures for the present embodiment of the pipe.

The tube 2 may be produced from an electrically insulating material, for example a polymer. That material may advantageously be a polyamide (PA), or a polyvinylidene fluoride (PVDF).

On this tube 2 there are, for example, at least the following layers, from the inside (closest to the axis X) towards the outside (away from the axis X):
a first insulating layer 3,
a heating layer 4, and
a second insulating layer 5.

The pipe 1 may comprise other layers. For example, the tube may be covered with a protective layer in order to limit the corrosion of the said tube, generally made of steel. For example, the tube may also be covered with an adhesion layer to encourage the next layer (insulating layer 3) to adhere to the said tube. For example, the pipe may also comprise an external thermal insulation layer, for example on top of or incorporated into the second insulating layer 5.

The first and second electrically insulating layers 3, 5 are electrically insulating. They are, for example, made of a polymer or of a composite containing glass fibres embedded in the polymer (matrix) or of a composite containing Kevlar fibres embedded in the polymer. The polymer is advantageously suited to adhering well to the other layers: the tube 2 and the heating layer 4. This polymer may be identical to the one used in the heating layer 4 and/or in the tube 2 as cited hereinabove.

The heating layer 4 is a composite comprising at least carbon fibres embedded in a polymer. This polymer may advantageously be a polyamide (PA), or a polyvinylidene fluoride (PVDF).

The carbon fibres are able to conduct an electrical current in order to heat the tube through a Joule-heating effect. The electrical resistance R of such a heating layer 3 between the first and second ends (1a, 1b) of the pipe can be calculated approximately using the following formula:

$$R = \rho_{fibre} \cdot \frac{L}{\pi \cdot D_{mean} \cdot E_p \cdot \cos^2\alpha}$$

in which:
$\rho_{fibre}$ is a resistivity of the carbon fibres, for example having the value $\rho_{fibre}=1.9\times10^{-5}\Omega.m$ at a temperature of 20° C., which is substantially 1100 times more resistive than copper at 20° C.,
L is a length of the heating layer 4 between the first and second ends (1a, 1b) in the longitudinal direction X,
$D_{mean}$ is a mean diameter of the heating layer 4,
$E_p$ is a thickness of the heating layer in a transverse direction, and
$\alpha$ is an angle of inclination that the carbon fibres make with respect to the direction of the axis X.

Based on the angle of inclination of the carbon fibres in the heating layer 4, a desired electrical resistance R for heating can be obtained.

Based on this heating layer 4 comprising carbon fibres which are well distributed in the polymer material of this layer, the heating around the tube 2 is more uniform. Furthermore, if one or more carbon fibres become broken at a point on the pipe, the electrical current can nonetheless continue to pass along the other carbon fibres which are not broken. Thus, the electrical characteristics (the resistance) are not greatly downgraded.

The various layers of the pipe 1 may be manufactured by known means using preformed strips of composite, each preformed strip extending in a direction and comprising fibres (carbon, glass or Kevlar fibres) embedded in a polymer matrix. The fibres may potentially be oriented in the said direction of the preformed strip.

It is an object of the present invention to make the electrical connection that allows the heating layer 4 of the pipe 1 to be supplied with electrical power.

Figure 6:
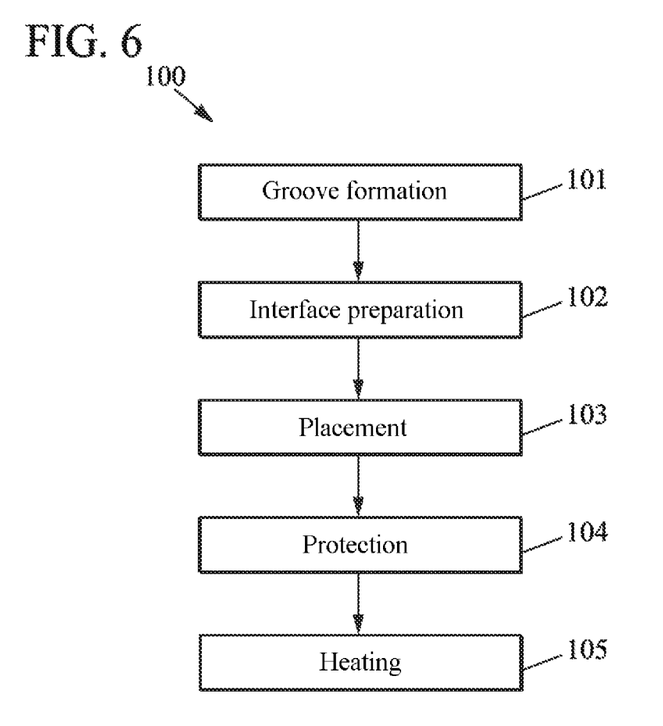
FIG. 6 is a diagram showing the succession of steps in one embodiment of the method for forming an electrical connection on the pipe of FIG. 1.

Notably, the proposal is to use a method 100 for forming an electrical connection 10 in which method the following steps (FIG. 6) are performed:
- a groove-formation step 101 in which a groove 6 is formed in the heating layer 4,
- an interface-preparation step 102 in which a junction layer 7 formed of an electrically conducting junction material is placed on at least one zone of the heating layer 4 of the groove 6, and
- a placement step 103 in which a connection strip 8 comprising second fibres formed of a second electrically conducting material is wound on the junction layer 7 (and potentially on the heating layer), the said connection strip 8 having at least one end portion 8a protruding beyond the said groove 6 to form a terminal suited to supplying the pipe with electrical power.

The zone of the heating layer is part of the said layer, to which the junction layer is added in order to improve the electrical conduction.

The electrical connection 10 is therefore the combination of the following elements: the groove 6 filled with at least one junction layer 7 and with a connection strip 8.

Additionally, the above steps may be followed by a protection step 104 in which a protective layer 9 is formed by winding on top of the connection strip 8 a composite strip containing third fibres embedded in a matrix, the said third fibres being formed of a third material that is not electrically conductive, for example glass or Kevlar.

Finally, a heating step 105 may potentially be performed in which the electrical connection 10 is heated in order to crosslink at least the junction layer 7 and potentially the other layers of the electrical connection: the connection strip 8, the protective layer 9.

FIGS. 2 to 5 depict the pipe 1 in longitudinal section X as it appears in the successive steps 101 to 104 respectively.

Figure 2:
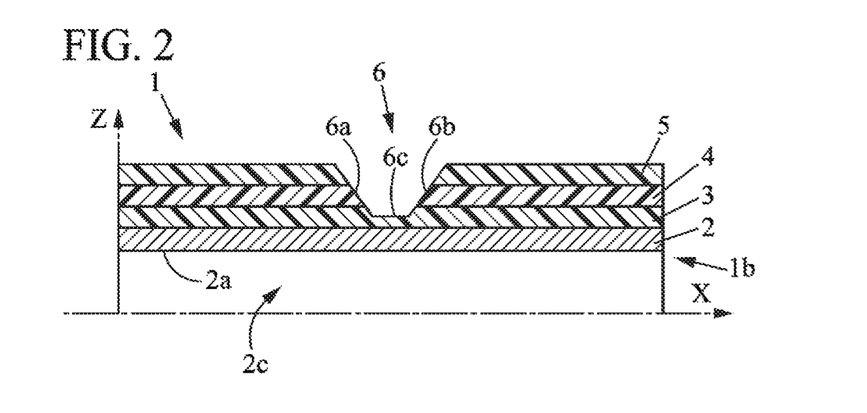
FIG. 2 is a view in longitudinal section of the pipe of FIG. 1 modified according to a first step of the method for forming an electrical connection.

In FIG. 2, the groove 6 is formed in a pipe 1 that is continuous, which means to say that all over its profile it has the three layers stacked up on the tube 2: the first insulating layer 3, the heating layer 4 and the second insulating layer 5.

The groove 6 is, for example, formed by machining this pipe in the rough state, for example by removing material, and for example using a method of turning the pipe.

This groove 6 is a cut which in radial section is in the shape of a triangle or trapezium with at least two lateral internal surfaces 6a, 6b that face one another in the longitudinal direction X. These first and second surfaces 6a, 6b are advantageously inclined with respect to the longitudinal direction X, for example by an angle of between 30 degrees and 60 degrees.

The groove 6 extends from the outside towards the inside (towards the axis X) and passes at least through the outermost second insulating layer 5. It then passes through the heating layer 4 partially or completely. It also advantageously extends to a small extent into the first insulating layer 3, for example over just 10 per cent of the thickness thereof. In this way it can be ensured that the entire thickness of the heating layer 4 has been cut by the groove 6.

In the case of a cut with a trapezium-shaped radial section, this cut also comprises a bottom surface 6c extending horizontally parallel to the longitudinal direction X. The groove 6 thus has sufficient width in which to install the electrical connection 10.

Figure 3:
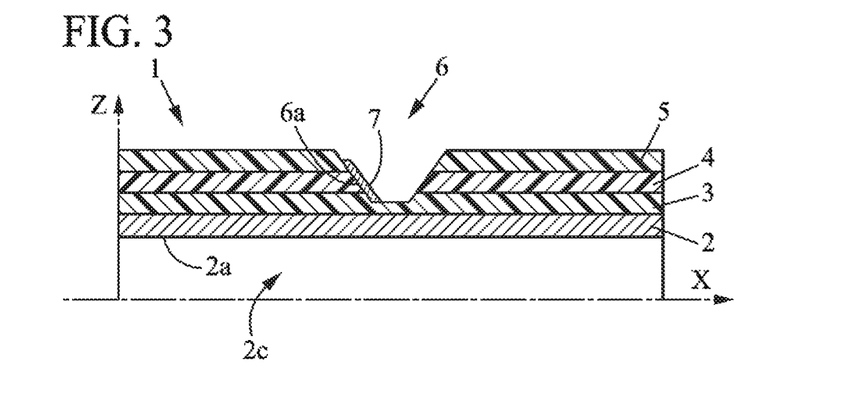
FIG. 3 is a view in longitudinal section of the pipe of FIG. 1 modified according to a second step of the method for forming an electrical connection.

In FIG. 3, a junction layer 7 is placed in the groove 6 formed in the previous step. This junction layer 7 is, for example, placed along just one of the two surfaces that are the first surface 6a and the second surface 6b. If the groove 6 (electrical connection 10) is made near a second end 1b of the pipe 1 in the longitudinal direction X and the current to be generated in the heating layer 4 is to spread through the said layer towards the first end 1a, then it is necessary above all to cover the first surface 6a which is on the opposite side to the second end 1b, as has been depicted in the figures.

This junction layer 7 is formed of an electrically conducting junction material. For example, the junction material is a polymer that is intrinsically a conductor of electricity or not a conductor of electricity and/or is potentially filled with electrically conducting particles. The particles are chosen from a list comprising a metal such as silver, copper, or graphene, carbon black, and carbon nanotubes.

The particles are small-sized elements of spherical, elliptical or any other shape. They have a size (largest dimension) for example less than 0.1 mm, and preferably less than 0.01 mm. These particles can thus be mixed into or used to fill a polymer without having a great effect on its viscosity. These particles are in the form of powder.

This junction material gives the electrical connection 10 very good electrical conduction properties, namely a very low electrical resistance, making it possible to avoid localized heating in the said electrical connection 10.

Figure 4:
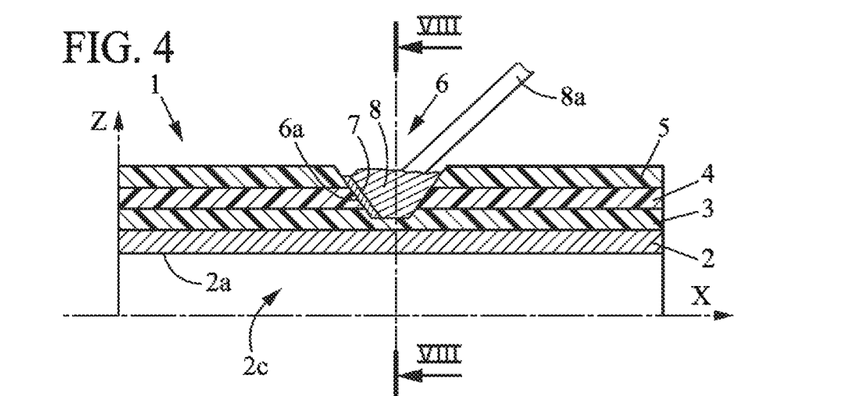
FIG. 4 is a view in longitudinal section of the pipe of FIG. 1 modified according to a third step of the method for forming an electrical connection.

In FIG. 4, a connection strip 8 is wound in the groove 6 from the bottom surface 6c up to a thickness substantially equivalent to the heating layer 4. This connection strip 8 is superposed on the junction layer 7. A portion 8a of the length of the connection strip 8 is also left free outside the groove 6 (is not wound in the groove). This portion 8a forms an electrical connection terminal that can be used as an element for supplying electrical power to the pipe 1.

There are a number of conceivable alternative ways in which to wind the connection strip 8 in the groove 6. These alternative ways are set out at the end of the description and in FIGS. 8 to 10.

The pipe or a collection of pipes electrically connected to one another need to comprise at least two electrical connections (two electrical connection terminals), the first being connected to a first phase of the power supply and the second being connected to a second phase of the power supply, in order to generate a current in the heating layer 4 of the pipe 1 via the connections 10. The power may be supplied as a current or as a voltage, of DC or AC type. This supply of power therefore has at least two phases and may even be three-phase.

The connection strip 8 comprises second fibres formed of a second electrically conducting material.

The second fibres are braided or nonbraided.

The second material of these second fibres is, for example, copper.

The assembly formed in FIG. 4, junction layer 7 and connection strip 8, may potentially be heated in order to crosslink the polymers of the matrices of its components.

Figure 5:
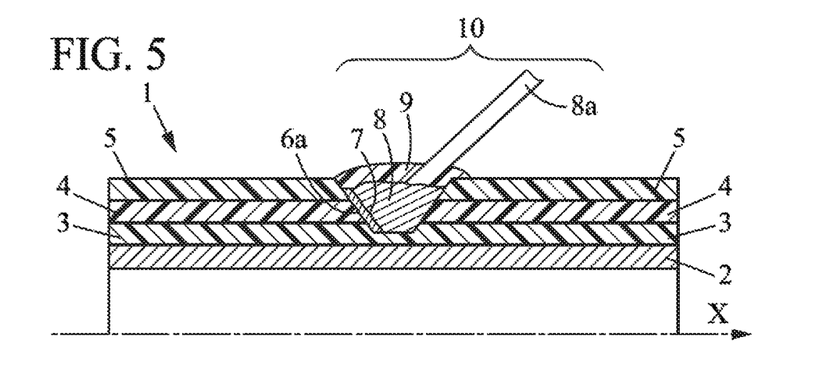
FIG. 5 is a view in longitudinal section of the pipe of FIG. 1 modified according to a fourth step of the method for forming an electrical connection.

In FIG. 5, a protective layer 9 is formed on the connection strip 8 by winding onto this connection strip 8 a composite strip that comprises third fibres embedded in a matrix, the said third fibres being formed of a third material that is not electrically conducting.

The third material is, for example, glass or Kevlar.

The portion 8a of the connection strip 8 that remains free is not covered. The composite strip of the protective layer 9 is wound on a first side and on a second side of this portion in order to leave this portion 8a free and protruding from the protective layer 9.

The assembly formed in FIG. 5, junction layer 7, connection strip 8 and protective layer 9, is potentially heated or potentially heated again in order to crosslink the polymers of the matrices of its components.

The polymer used in the matrices of the various composite materials is, for example, a polyamide (PA), or a polyvinylidene fluoride (PVDF).

Thanks to the method used, electrical connections can be formed at any point along the length of the pipe 1.

Figure 7:
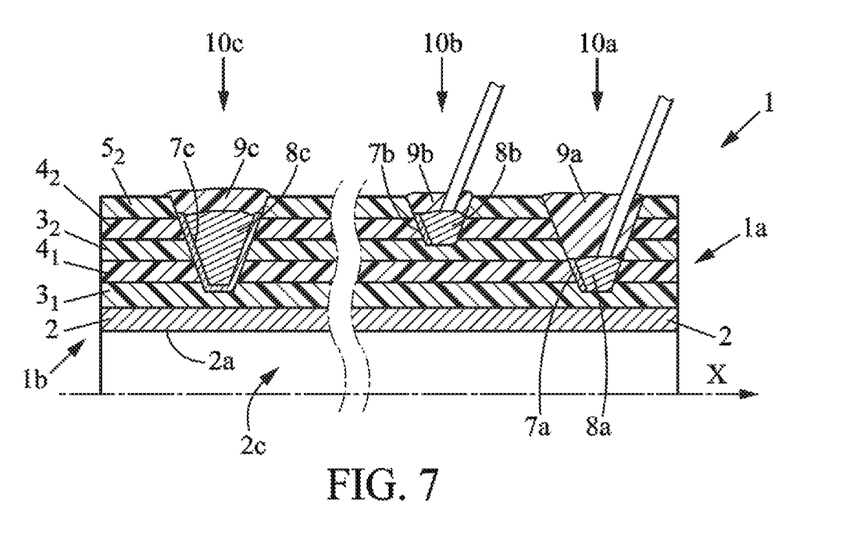
FIG. 7 is a view in longitudinal section of a pipe to which the method is applied a number of times in order to produce a number of electrical connections.

Electrical connections may also be formed at greater or lesser depths in the layers of a pipe, as shown in FIG. 7. In that figure, the pipe 1 comprises five layers on top of the tube 2:
- a first insulating layer $3_1$,
- a first heating layer $4_1$,
- a second insulating layer $3_2$,
- a second heating layer $4_2$, and
- a third insulating layer 5.

The materials of these layers are of the same type as those described hereinabove. For example, the insulating layers $3_1$, $3_2$, 5 are made of glass fibres embedded in a polymer matrix, and the heating layers $4_1$, $4_2$ are made of carbon fibres embedded in a polymer matrix, advantageously identical to the preceding one.

In the example of FIG. 7, there are formed, as before:
- a first electrical connection 10a at the level of the first heating layer $4_1$,
- a second electrical connection 10b at the level of the second heating layer $4_2$, and
- a third electrical connection 10c between the first and second heating layers $4_1$, $4_2$.

The third electrical connection 10c differs from the previous ones in that it does not have any free portion protruding from the pipe 1 and passing through the protective layer 9c and in that the junction layer 7 extends into the groove 6 from the first heating layer $4_1$ to the second heating layer $4_2$.

The other two electrical connections 10a, 10b do have this free portion protruding from each of the respective protective layers 9a, 9b.

Thanks to this pipe 1 with two heating layers and thanks to these three electrical connections, the first and second electrical connections can be situated towards a same end of the pipe 1 in the longitudinal direction X, for example near the second end 1a as depicted in the figure. The third electrical connection 10c is situated at the opposite end of the pipe, near the second end 1b. The first heating layer causes the electricity to pass from a first end to the second end of the pipe 1, whereas the second heating layer provides the return; it causes the electricity to pass from the second end towards the first end of the pipe 1. As the supply of electricity to the pipe 1 is at just one end, it is easier to achieve.

The two heating layers $4_1$, $4_2$ contribute to the heating of the pipe 1 through a Joule-heating effect. Such a pipe 1 is thermally more efficient.

Figure 8:
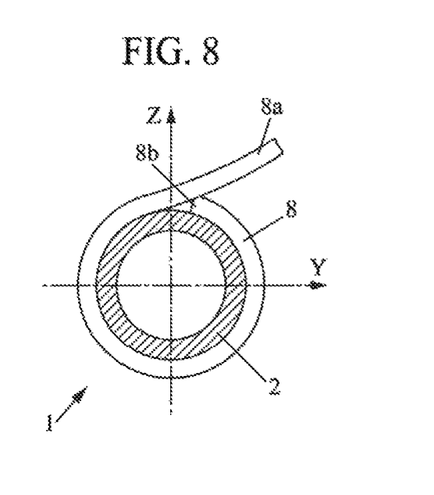
FIGS. 8 to 10 are transverse sections of pipes produced with three alternative forms of winding of the connection strip in the groove.
Figure 9:
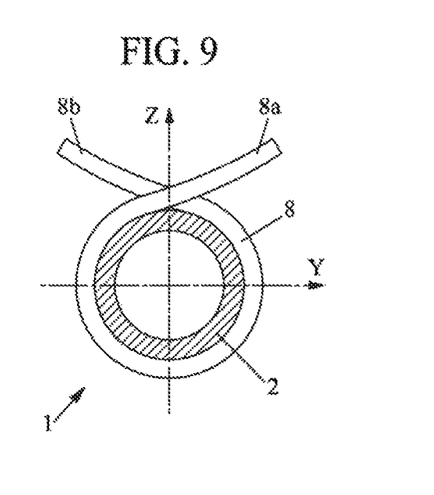
Figure 10:
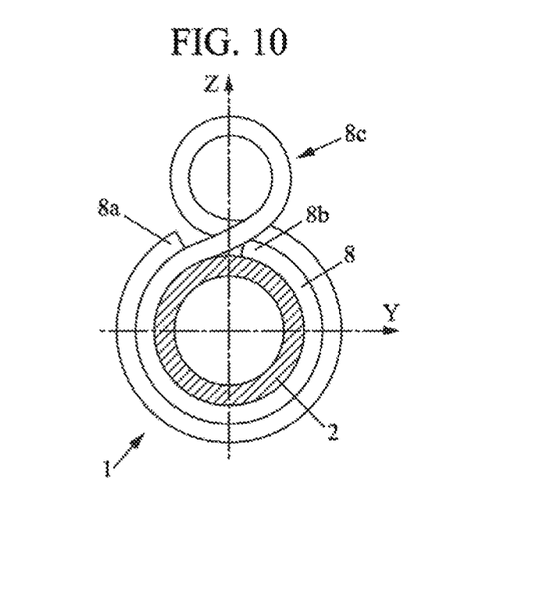

FIGS. 8 to 10 will now be used to detail alternative forms of methods for winding the connection strip 8 in the groove 6.

In the first alternative form of FIG. 8, the connection strip 8 comprises an end 8b placed in the bottom of the groove 6. The strip is then wound for example in a clockwise direction about the axis X until the said end 8a has been covered with one or more successive layers, and then extends radially towards the end 8a which thus forms what is referred to as the "free" portion 8a.

Only the second end 8a of the connection strip 8 is left free radially to form the electrical connection terminal.

In the second alternative form of FIG. 9, the connection strip 8 comprises a first end 8b kept radially at some distance from the groove 6. It is then wound in the groove 6 for example in a clockwise direction about the axis X, in one or more turns. Next, it extends radially towards the second end 8a which thus forms what is referred to as the "free" portion 8b.

The two ends 8a, 8b of the connection strip 8 are left free radially, each or both being able to form the electrical connection terminal.

In the third alternative form of FIG. 10, the connection strip 8 comprises a first end 8b placed at the bottom of the groove 6. The strip is then wound in a first direction, for example a clockwise direction, about the axis X, until it covers the said first end 8a in one or more successive layers. Next, it extends radially to form a loop 8c which returns radially towards its starting point. Next, the connection strip 8 is wound in a second direction, for example an anticlockwise direction, about the axis X (the opposite to the first direction), covering the previous layers with one or more successive layers, as far as the second end 8a which may remain in the groove 6.

The two ends 8a, 8b of the connection strip 8 are inside the groove 6, and an intermediate loop 8c between the first and second ends 8a, 8b extends freely in a radial direction to form the electrical connection terminal.

The method according to the invention may also be applied to other heating devices (other than a pipe) such as devices as described in documents FR-2958994 (heating blanket) and FR-2958995 (inflatable system having a heating membrane). To implement these, reference may be made to the descriptions of these published documents.

Thus, these heating devices comprise, as for a heating pipe, a heating layer in their thickness, which layer is made up of an electrically conducting material. This material contains for example carbon fibres embedded in an elastomer.

In the case of such heating devices, the method according to the invention also comprises the following steps:
- an interface-preparation step 102 in which a junction layer formed of an electrically conducting junction material is placed on at least one zone of the heating layer, and
- a placement step 103 in which a connection strip comprising second fibres formed of a second electrically conducting material is placed on the junction layer (and possibly on the heating layer), the said connection strip having at least one portion protruding beyond the said device and forming a terminal for supplying this device with electrical power.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for forming an electrical connection on a device, the method comprising:
    providing the device having a heating layer, said heating layer comprising first fibres made of carbon, a first electrically conducting material,
    preparing an interface by providing a junction layer formed of an electrically conducting junction material on the heating layer,
    a placement by placing a connection having a second fibres and a connection strip having at least one portion protruding beyond the device on the junction layer and forming a terminal for supplying electrical power to the device,
    wherein the second fibres formed of a second electrically conducting material, and forming a groove in the heating layer, the groove adapted to accommodate an electrical connection, and
    wherein in the preparing the interface further comprising placing the junction layer, over a zone of the heating layer that is uncovered in the groove, and
    in the placement, the connection strip is wound around the device, in the groove and on the junction layer, and the portion protrudes from the groove.

2. The method according to claim 1, wherein the providing the device further comprising a pipe, said pipe having
    an internal hollow tube extending in a longitudinal direction and adapted for transporting a fluid.

3. The method according to claim 2, in which the groove formed by a groove formation, comprises a first surface in the longitudinal direction and a second surface in a direction opposite to the longitudinal direction, and in which the junction layer is placed on one of the first and second surfaces.

4. The method according to claim 2, in which the groove formed by a groove formation, is in the shape of a triangle or of a trapezium, the said groove extending throughout the thickness of the heating layer.

5. The method according to claim 2, in which the groove formed by a groove formation, is formed by machining of the heating layer.

6. The method according to claim 1, further comprising forming a protection layer on the connection strip with a composite strip, said composite strip comprising a plurality of third fibres embedded in a matrix, the third fibres being formed of a third material that is not electrically conductive.

7. The method according to claim 1, further comprising heating the electrical connection in order to cross link at least the junction layer.

8. The method according to claim 1, further comprising providing a polymer filled with electrically conducting particles for the junction material.

9. The method according to claim 8, wherein the electrically conducting particles are chosen from a list comprising silver, copper, graphene, carbon black, or carbon nanotubes.

10. The method according to claim 1, further comprising providing braided second fibres.

11. The method according to claim 1, further comprising providing copper as the second material.

* * * * *